(12) United States Patent
McNamara et al.

(10) Patent No.: US 11,708,534 B2
(45) Date of Patent: Jul. 25, 2023

(54) REACTOR ASSEMBLY

(71) Applicant: Plastic Energy Limited, London (GB)

(72) Inventors: David McNamara, London (GB); Christopher Strivens, Sevenoaks (GB); Andres Yabrudy, Wallington (GB); Patrick Dunphy, Durrow (IE)

(73) Assignee: Plastic Energy Limited, London (GB)

( * ) Notice: Subject to any disclaimer, the term of this patent is extended or adjusted under 35 U.S.C. 154(b) by 65 days.

(21) Appl. No.: 17/280,593

(22) PCT Filed: Sep. 26, 2019

(86) PCT No.: PCT/GB2019/052711
§ 371 (c)(1),
(2) Date: Mar. 26, 2021

(87) PCT Pub. No.: WO2020/065316
PCT Pub. Date: Apr. 2, 2020

(65) Prior Publication Data
US 2021/0371753 A1    Dec. 2, 2021

(30) Foreign Application Priority Data
Sep. 26, 2018   (GB) ...................................... 1815701

(51) Int. Cl.
*C10B 43/04*   (2006.01)
*B01J 19/00*   (2006.01)
(Continued)

(52) U.S. Cl.
CPC ............ *C10B 43/04* (2013.01); *B01F 27/052* (2022.01); *B01F 27/0727* (2022.01);
(Continued)

(58) Field of Classification Search
CPC .............................. B01J 19/0066; B01J 19/20
(Continued)

(56) References Cited

U.S. PATENT DOCUMENTS 168,483 A * 10/1875 Hamilton .............. F16B 39/101
411/88
1,215,526 A    2/1917  Hansen
(Continued)

FOREIGN PATENT DOCUMENTS

CN    102716687 A    10/2012
CN    102732276 A    10/2012
(Continued)

OTHER PUBLICATIONS

An Examination Report issued by the Japanese Patent Office dated Jun. 21, 2022, which corresponds to Japanese Patent Application No. 2021-517744 and is related to U.S. Appl. No. 17/280,593.
(Continued)

*Primary Examiner* — Jonathan Luke Pilcher
(74) *Attorney, Agent, or Firm* — Studebaker & Brackett PC

(57) ABSTRACT

A reactor assembly is provided for heating plastic material. The reactor assembly includes: a reactor vessel including a central axis; and an agitator mounted within the reactor vessel. The agitator includes: one or more blade(s) distal from the central axis for mixing contents of the reactor vessel in use; and one or more wearing parts mounted to the blade(s) to extend from the blade(s).

13 Claims, 4 Drawing Sheets

(51) Int. Cl.

| | | |
|---|---|---|
| *B01J 19/18* | (2006.01) | |
| *C10B 7/02* | (2006.01) | |
| *C10B 53/07* | (2006.01) | |
| *C10G 1/10* | (2006.01) | |
| *B09B 3/40* | (2022.01) | |
| *B01F 27/052* | (2022.01) | |
| *B01F 27/091* | (2022.01) | |
| *B01F 27/92* | (2022.01) | |
| *B01F 27/072* | (2022.01) | |
| *B01F 27/1144* | (2022.01) | |
| *B01F 27/1145* | (2022.01) | |
| *B01F 101/00* | (2022.01) | |

(52) U.S. Cl.
CPC ........ *B01F 27/091* (2022.01); *B01F 27/1144* (2022.01); *B01F 27/11451* (2022.01); *B01F 27/92* (2022.01); *B01J 19/0066* (2013.01); *B01J 19/18* (2013.01); *B09B 3/40* (2022.01); *C10B 7/02* (2013.01); *C10B 53/07* (2013.01); *C10G 1/10* (2013.01); *B01F 2101/2805* (2022.01); *B01J 2219/00247* (2013.01); *B01J 2219/00779* (2013.01); *C10G 2300/1003* (2013.01)

(58) Field of Classification Search
USPC .......................................... 366/285, 310, 312
See application file for complete search history.

(56) References Cited

U.S. PATENT DOCUMENTS

| | | | |
|---|---|---|---|
| 1,904,380 A | 4/1933 | Morrell et al. | |
| 3,747,899 A * | 7/1973 | Latinen | B01F 27/60 366/310 |
| 3,751,010 A * | 8/1973 | Latinen | B01F 35/00 366/144 |
| 4,274,751 A | 6/1981 | Rector et al. | |
| 4,515,483 A | 5/1985 | Müller et al. | |
| 5,738,025 A * | 4/1998 | Tachibana | A62D 3/40 208/67 |
| 2002/0134244 A1 | 9/2002 | Gu | |
| 2005/0173237 A1* | 8/2005 | Bridgwater | B01J 8/10 422/198 |
| 2011/0237762 A1 | 9/2011 | Goto et al. | |
| 2017/0233657 A1 | 8/2017 | McNamara et al. | |

FOREIGN PATENT DOCUMENTS

| | | |
|---|---|---|
| CN | 202606153 U | 12/2012 |
| CN | 103509579 A | 1/2014 |
| CN | 203425767 U | 2/2014 |
| CN | 105062517 A | 11/2015 |
| CN | 107880916 A | 4/2018 |
| FR | 1 412 011 A | 9/1965 |
| FR | 2 859 646 A1 | 3/2005 |
| GB | 2126491 A | 3/1984 |
| GB | 2488302 B | 11/2013 |
| JP | S5756030 A | 4/1982 |
| JP | S58 58138 A | 4/1983 |
| JP | S63 209547 A | 8/1988 |
| JP | H02-075607 A | 3/1990 |
| JP | H07-088349 A | 4/1995 |
| JP | H07-207276 A | 8/1995 |
| JP | H09-013044 A | 1/1997 |
| JP | H09-13045 A | 1/1997 |
| JP | H0913044 A | 1/1997 |
| JP | H09168731 A | 6/1997 |
| JP | 2000-233122 A | 8/2000 |
| JP | 2004-269838 A | 9/2004 |
| JP | 2005-200537 A | 7/2005 |
| JP | 2008-531799 A | 8/2008 |
| KR | 100602732 B1 | 7/2006 |
| KR | 100796805 B1 | 1/2008 |
| RU | 74688 U1 | 7/2008 |
| WO | 95/17245 A1 | 6/1995 |
| WO | 2003/029384 A1 | 4/2003 |
| WO | 2011034446 A1 | 3/2011 |
| WO | 2013/088105 A1 | 6/2013 |
| WO | 2016/030460 A1 | 3/2016 |

OTHER PUBLICATIONS

International Search Report issued in PCT/GB2019/052711; dated Nov. 15, 2019.
Written Opinion issued in PCT/GB2019/052711; dated Nov. 15, 2019.
Further Search Report issued by the UK IPO in corresponding Application No. 1815701.6, dated Dec. 9, 2019.
An Examination Report issued by the Australian Patent Office dated Apr. 6, 2022, which corresponds to Australian Patent Application No. 2019348728 and is related to U.S. Appl. No. 17/280,593.
Russian Search Report which corresponds to Russian Patent Application No. 2021111589 and is related to U.S. Appl. No. 17/280,593.
Russian Decision to Grant which corresponds to Russian Patent Application No. 2021111589 and is related to U.S. Appl. No. 17/280,593.
An Office Action and Search Report issued by the Chinese Patent Office dated Feb. 15, 2022, which corresponds to Chinese Patent Application No. 201980063027.6 and is related to U.S. Appl. No. 17/280,593.
Prepared by the Editorial Committee of Tests for Impervious Wall Workers, Test Bank for Water Conservancy, Nov. 2000, p. 274, The Yellow River Water Conservancy Press, Zhengzhou, China.
Du et al., Pocket Manual for Casting Workers, Nov. 1999, p. 528, China Machine Press, Beijing, China.
Zhou et al., Newest Hardware Product Manual, Feb. 2015, p. 583, Henan Science and Technology Press, Zhengzhou, China.
Wang et al., Design of Mixing Equipment, Apr. 2000, pp. 155-158, China Machine Press, Beijing, China.
Zhu, Grease Technology Encyclopedia, 2004, pp. 117-118, China Petrochemical Press, Beijing, China.
An Office Action issued by the Korean Intellectual Property Office dated Oct. 14, 2022, which corresponds to Korean Patent Application No. 10-2021-7012410 and is related to U.S. Appl. No. 17/280,593.
An Examination Report issued by the Japanese Patent Office dated Jan. 24, 2023, which corresponds to Japanese Patent Application No. 2021-517744 and is related to U.S. Appl. No. 17/280,593.

* cited by examiner

REACTOR ASSEMBLY

The present invention is directed to a reactor assembly for heating plastic material.

End of life plastic chemical recycling technology is generally designed to recycle mixed waste-plastics into a variety of liquid hydrocarbon products. The waste plastics for use in such a process may, for example, include low density polyethylene (LDPE), high density polyethylene (HDPE), polystyrene (PS), and/or polypropylene (PP). These waste plastics are converted into the liquid hydrocarbon products by extruding and pumping the plastic feed in molten form into reactor vessels. The reactor vessels are externally heated by furnace systems to a temperature in excess of 350° C. This produces rich saturated hydrocarbon vapour from the molten plastic. This flows out of the reactor vessels through contactor vessels and will condense the heavier vapour fractions to maintain a target outlet temperature set point which is determined by the end-product specification. This is then distilled at near-atmospheric pressures in a downstream atmospheric distillation column.

Each reactor vessel is fitted with an internal rotating agitator assembly. This agitator assembly assists with the mixing of the contents of the reactor vessel. Such an illustrative assembly will be described in more detail in relation to FIG. 1.

These agitators are installed within the reactor vessel in order to improve a number of functions of the system. In particular, the agitators may increase the thermal homogenisation of the molten plastic mixture. This may reduce the reaction time by maximising the heat transfer from reactor vessel skin and preventing cold spots from forming. This thermal homogenisation may further prevent vapour bubbles from forming within the plastic mass of more volatile hydrocarbon chains. This may then reduce the risk of subsequent pressure and/or temperature spikes. The agitators may remove problematic by-products (material known as "char") which lead to coking forming on the inner surface of the reactor vessel wall. An excess build-up of char may inhibit thermal conduction from the outer furnace to the molten plastic. The agitator may also help char drying by continuously mixing it and bringing it into contact with hotter portions of the reactor vessel, such as the vessel skin. Finally, the agitator may improve char by-product removal by forcing the char from the reactor vessel.

Char is a fine carbon-based powder which is abrasive in nature. The working parts inside the reactor vessel, such as the agitator, are constantly exposed to this char. This char may be packed into the interstitial space between the outer diameter defined by rotation the agitator and the inner diameter of the reaction vessel. Over time the char may be compacted in this space as it is forced there by the agitator. Additionally, exposure of molten plastic to the comparatively higher temperature on the inner surface of the vessel may lead to a build-up of fouling. This may lead to the formation of a hard, brittle carbon-based coking layer which can have negative effects on heating performance, batch processing times, system efficiency and longevity.

There is therefore a need for an improved agitator assembly design which may reduce the effect of coking build-up on a reaction process.

A reactor assembly for heating plastic material according to the present invention is provided according to claim 1. The reactor assembly comprises: a reactor vessel comprising a central axis; an agitator mounted within the reactor vessel, the agitator comprising: one or more blade(s) distal from the central axis for mixing contents of the reactor vessel in use; and one or more wearing parts mounted to the blade(s) to extend radially further than the blade(s) from the central axis.

The agitator is mounted within the reactor vessel, but is not necessarily entirely within the reactor vessel. A portion of the agitator may extend outside the reactor vessel.

This reactor assembly allows the build-up of char to be removed without damage to the agitator itself or to the reactor vessel. Instead, the wearing parts engage the char.

The distal blade(s) may be generally helical.

Helical blade(s) are particularly effective for ensuring consistent mixing in the reactor vessel.

The wearing part(s) may be detachably mounted to the blade(s).

This allows the wearing part(s) to be replaced as they are worn down, instead of the traditional replacement of the agitator blades.

The wearing part(s) may be adjustable for adjusting the radial distance of the wearing parts from the central axis.

This allows the distance between the wearing part(s) and the reactor vessel inner wall to be adjusted such that the wearing part(s) may then be re-positioned as they wear down in order to maintain a preferred distance between the part(s) and the wall. In particular, this distance may define a maximum allowable coking layer thickness.

The wearing part(s) or the blade(s) may comprise an elongate slot, and the wearing parts may be mounted to the arm(s) via one or more bolts passing through the slot.

This is a simple method to achieve the adjustment.

The assembly may further comprise one or more sprung washer(s) and the one or more bolts may pass through the sprung washer(s) to engage the wearing part(s).

These sprung washers maintain a strong attachment between the blade and the wearing part(s) even if the bolted connection loosens during use.

The agitator may comprise a plurality of blades, preferably two blades.

This is a preferable arrangement for consistent mixing.

Each blade may comprise a plurality of wearing parts distributed along its length such that generally a plane orthogonal to the central axis at any point along the central axis in the region of the blades passes through at least one wearing part, preferably only one wearing part.

This can ensure that the entire inner surface is contacted by at least one wearable part.

The wearing part(s) may be formed of steel, preferably austenitic stainless steel, more preferably AISI 316, 316Ti, 310, 309, 321 and/or 302.

A method of maintaining a maximum thickness of coking on an internal surface of a reactor vessel according to the present invention is provided according to claim 10. The method comprises the steps of: providing a reactor vessel with a rotatable agitator therein, the agitator rotatable about a central axis and comprising one or more radially outermost wearable parts a first distance from the internal surface of the reactor vessel; operating the reactor vessel for a number of cycles such that the rotating wearable parts remove coking from the internal surface of the reactor vessel and thereby maintain the maximum thickness of coking; stopping the reactor vessel; and adjusting the wearable parts to maintain the first distance from the internal surface of the reactor vessel following any wear of the parts during operation.

Maintaining the coking thickness below this set level increases the heat transfer from the furnace to the molten plastic and hence minimises the cycle time of the system.

The maximum thickness may be no more than 10 mm, preferably no more than 8 mm.

This thickness generally allows sufficient heat transfer for the system to operate normally.

The present invention will now be described with reference to the following Figures in which.

Figure 1:
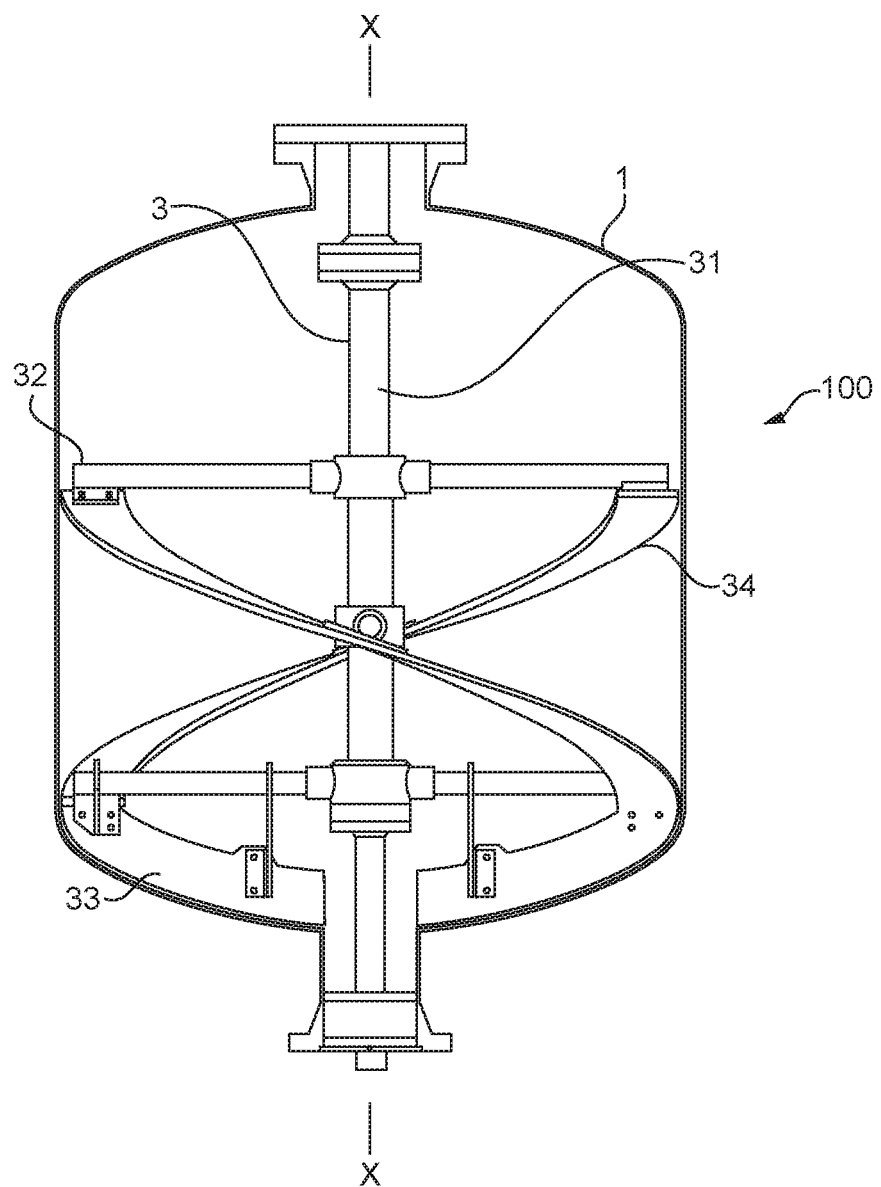
FIG. 1 shows an illustrative reactor vessel and agitator.

The illustrative system, or reactor assembly, 100 as shown in FIG. 1 comprises a reactor vessel 1 in which is rotatably mounted an agitator 3. The agitator 3 includes a central shaft 31 which generally extends longitudinally in the reactor vessel 1. The agitator 3 is mounted such that it is rotatable about an axis X. The axis X is preferably generally coincident with the central shaft 31 and centre-axis of upper and lower openings of the reactor vessel 1. A plurality of horizontal support bars 32 may extend from the central shaft 31 of the agitator 3. Attached to the horizontal bars 32 are a plurality of agitator blades 34. In alternative embodiments, the agitator 3 may not include any horizontal support bars 32 and the agitator blades 34 may directly attach to the central shaft 31 or may terminate at a free end.

While the present embodiment includes a plurality of agitator blades 34 it is anticipated that the agitator 3 may be designed in any suitable manner. In particular, the agitator 3 may include one agitator blade 34 or three or more agitator blades 34 in alternative embodiments. The agitator blades 34 are generally helical such that they are distally spaced from the central shaft 31 by generally constant distance. As such, the outer edge of the agitator blades 34 are generally spaced a constant distance from an inner surface of the reactor vessel 1. The agitator blades 34 may comprise at their lower end (either as a separate part or integral therewith) an agitator base portion 33. The base portion 33 generally conforms to a lower curved surface of the reactor vessel 1. The base portion 33 may be a separate component which is attached to a main portion of the agitator blades 34, or the base portion 33 may be integrally formed therewith.

In use, plastic is fed into the reactor vessel 1, preferably in the form of extruded melted plastic. The agitator 3 is driven by a motor and gearbox assembly to rotate about axis X. The agitator blades 34 then rotate in the plastic and ensure mixing of this plastic throughout the reactor vessel 1.

Figure 2A:
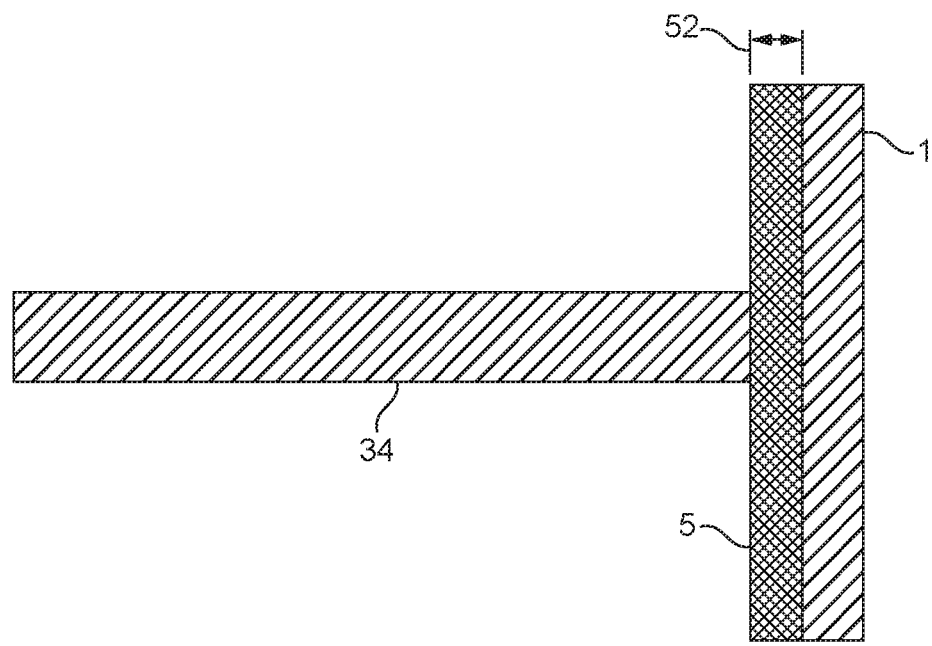
FIGS. 2A and 2B show representative drawings of coking build-up in an illustrative system.
Figure 2B:
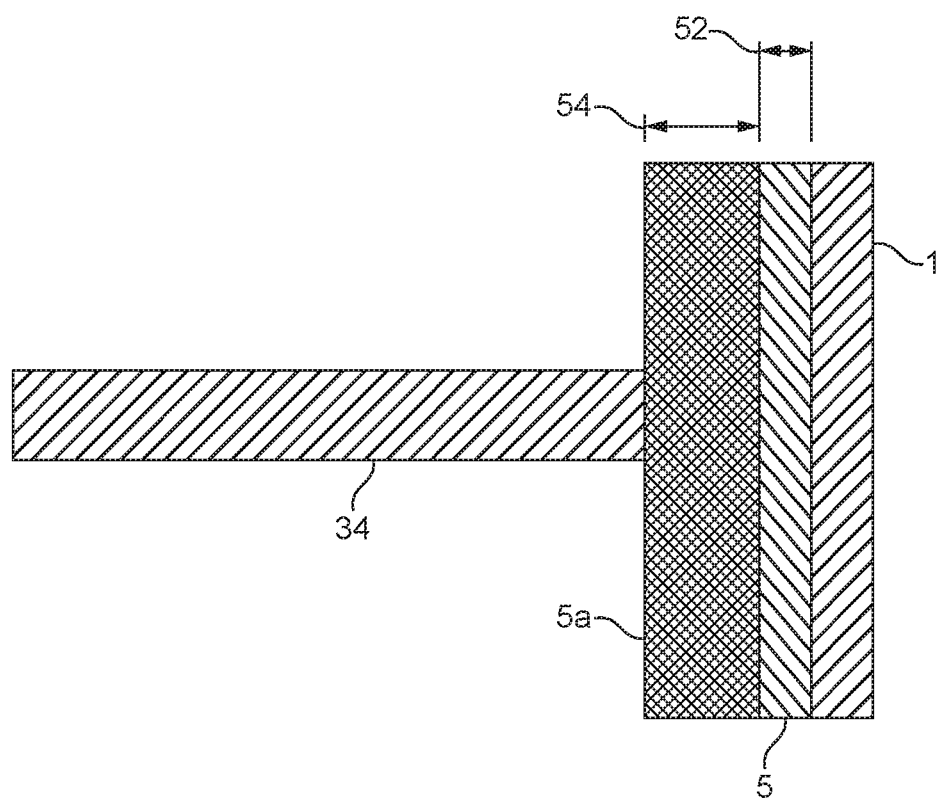

As discussed above, as the system 100 is operated, a layer of coking begins to form on an inner surface of the reactor vessel 1. This is shown in FIGS. 2A and 2B which depict a representative close-up view of a cross-section of the wall of the reactor vessel 1. FIG. 2A shows a system 100 early on in the life cycle of the agitator 3. As can be seen, the agitator blade 34 extends to a distally outmost point which is spaced a first distance from the inner surface of the reactor vessel 1. This distance allows a build-up of coking 5 to form between the outermost point of the agitator blade 34 and the inner surface of the reactor vessel 1 as the agitator 3 will define an outer diameter as it rotates at this distally outer-most point. This amount of coking will have a thickness 52 which matches the distance between the new agitator blade 34 and the inner surface of the reactor vessel 1. In preferred embodiments, this initial distance 52 may be less than or equal to 10 mm.

As the system 100 is operated over a number of cycles the agitator blade 34 is worn down by the constant contact with the coking 5. As a result, the outermost point of the agitator blade 34 will no longer extend the same distance radially from the axis X as when it was initially installed. As a result, an additional build-up of coking 5A is able to form with a corresponding increase in coking thickness 54. This increase in coking thickness 54 may reduce the efficiency of the reactor vessel 1. In particular, the coking 5 may reduce the heat transfer to the molten plastics within the reactor vessel 1.

In order to compensate for this reduced heat transfer, the reactor vessel 1 may be exposed to higher furnace temperatures. These higher temperatures may increase the wear on the reactor vessel 1, and thereby shorten the service life of the reactor vessel 1. In particular, creep deformation and resultant stress rates may be increased by the greater heat input. The greater heat input may also result in accelerated metal ageing, oxidation/scale spalling and/or embrittlement/hardening due to lattice grain growth. As a result of this, the reactor vessel 1 may need to be replaced more regularly than would otherwise be necessary. This reduced heat transfer may also require an extension of the batch processing time which slows down the overall process. The variability in batch times due to poor temperature control may then lead to further difficulties in downstream processes and variations in quality of output product.

Figure 3:
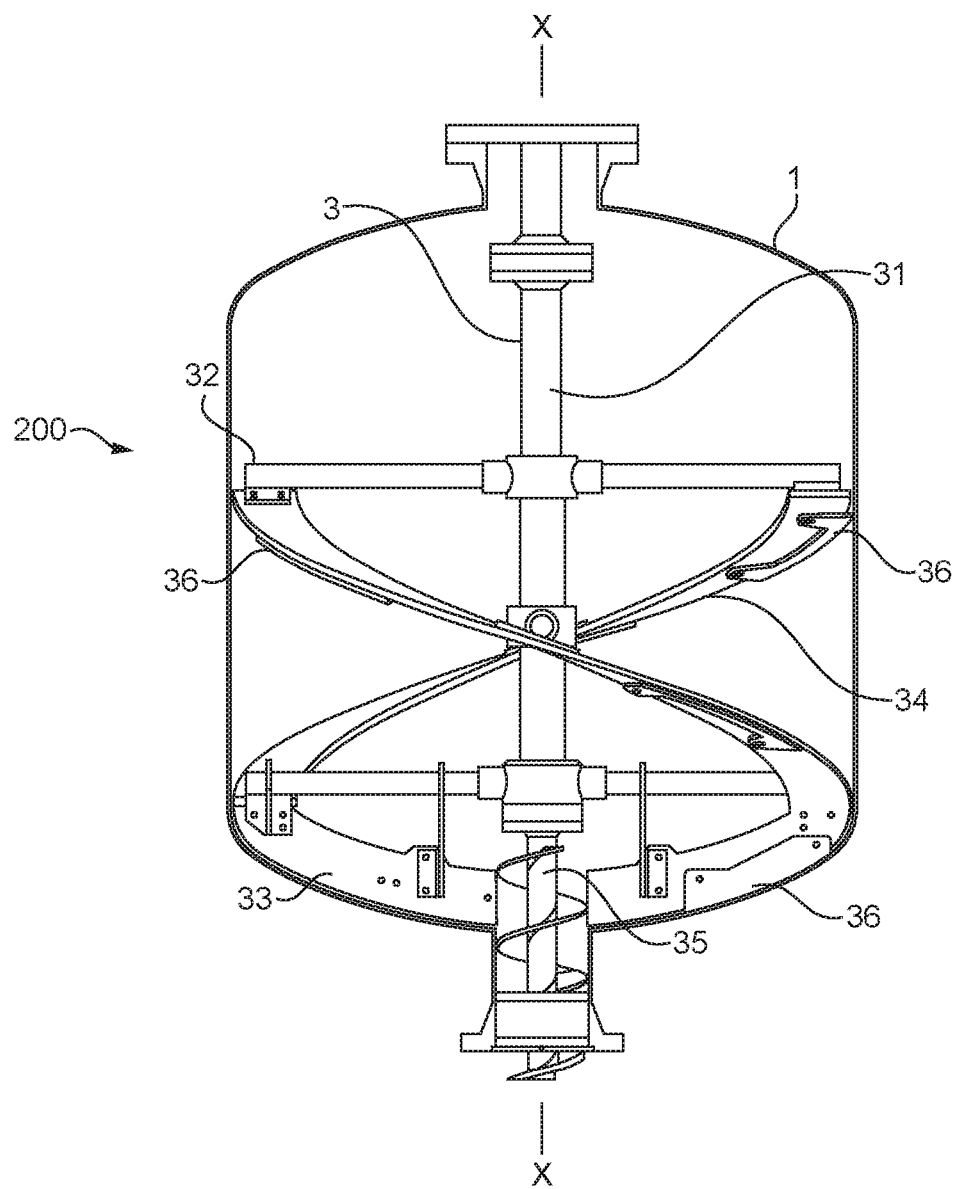
FIG. 3 shows a reactor vessel and agitator according to the present invention.

An improved system, or reactor assembly, 200 according to the present invention is shown in FIG. 3. This system 200 likewise includes a reactor vessel 1 and agitator 3 rotatably mounted therein. The agitator 3 is generally similar to that disclosed with respect to the illustrative system 100. However, additional wearing parts 36 are mounted to the blades 34 of the agitator 3. The wearing parts 36 are mounted on the blades 34. The wearing parts 36 may be mounted to generally align with the outermost edge of the blades 34. As the blades 34 wear down in use, the wearing parts 36 will then extend past the outermost edge of the blades 34. Alternatively, the wearing parts 36 may be mounted such that they extend distally further from the central shaft 31 than the outermost point of the agitator blades 34.

As a result, during rotation of the agitator 3 the wearing part 36 will preferentially contact the coking 5 forming on the inner surface of the reactor vessel 1.

While a single wearing part 36 could be provided along a length of each agitator blade 34 this is not preferable. Instead, a plurality of wearing parts 36 is preferably provided distributed along the agitator blades 34. Preferably, the wearing parts 36 are distributed without a gap therebetween. However, they may be spaced apart on each blade 34 with wearing parts 36 from different blades 34 overlapping (for example, axially) so that the wearing parts 36 are distributed along the agitator blades 34 such that a plane orthogonal to the axis X (i.e. a plane extending into the page in FIG. 3) can be defined along the portion of the axis X corresponding to the agitator blades 34 such that for any position along the axis in this region the plane passes through at least one wearing part 36. Preferably, the plane passes through only one wearing part 36 at any point. There may be a negligible amount of overlap between wearing parts 36 in order to ensure a continuous provision of wearing parts 36 over the entire region of interest.

The wearing parts 36 may be detachably fixed to the blade 34 such that they can be removed from the blade 34 in a non-destructive manner. That is, the wearing parts 36 can be removed from the blade 34 without any damage being done to the blade 34. This allows the wearing parts 36, which will wear at a greater rate than the rest of agitator 3, to be replaced with new wearing parts 36 without a total replacement of the agitator 3 or originally provided components such as the blades 34 or base portions 33. As such, the life of the agitator 3 may be extended.

Additionally, it is very difficult for large reactor vessels 1 to be accurately cylindrical. For example, its diameter may vary along its length. The wearing parts 36 can be mounted on the blades 34 in order to conform to the particular non-cylindrical shape of the vessel 1. As a result, the agitator 3 with wearing parts 36 may more closely contact the inner surface of the vessel 1 and thereby minimise the thickness of the coking layer 5.

Figure 4:
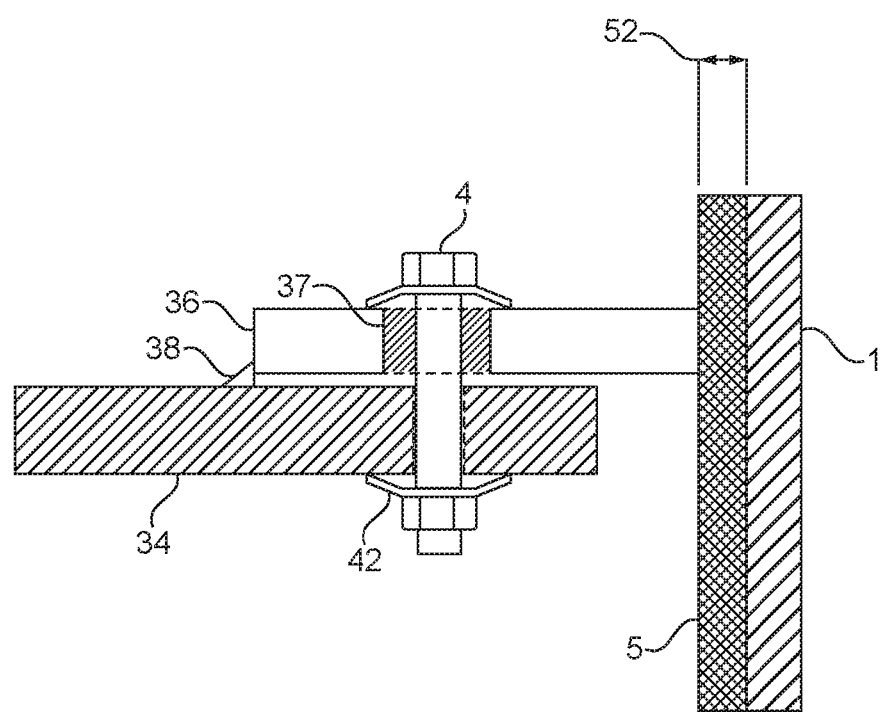
FIG. 4 shows a representation of coking build-up in a reactor vessel including an agitator according to the present invention.

Furthermore, the wearing parts 36 may be attached to the blade 34 such that they are adjustable. In particular, it may be possible to adjust the radial extension of the wearing parts 36 from the blade 34. In order to achieve this, the wearing parts 36 may be provided with an elongate slot 37 formed therein. A nut and bolt connection 4 passes through this slot 37 and a corresponding hole in the blade 34. As such, the wearing part 36 can be slid radially by the bolt 4 sliding in the slot 37. The bolt 4 may be tightened to hold the wearing part 36 in place. This is shown in FIG. 4. As a result of this, when the wearing part 36 wears down and the coking 5 may begin to increase in thickness 52, the system 200 can be stopped and the wearing plate 36 adjusted to maintain the initial coking thickness 52. Alternatively, the elongate slot 37 may be formed in the blade 34 and the hole can be formed in the wearing part 36. This alternative allows operation in the same manner.

In preferred embodiments, the coking thickness 52 can be maintained to be less than 10 mm. Spring washers 42 can be provided with the nut and bolt assembly 4. The spring washers 42 store elastic potential energy and thereby provide a clamping force to clamp the wearing parts 36 to the blade 34. As a result, even if the bolt assembly 4 relaxes in tightness during use the wearing part 36 is held rigidly to the blade 34. Additionally, the wearing part 36 may be spot welded 38 to the blade 34. This may prove particularly useful in agitators 3 which are designed to run at a high angular velocity and/or with an increased rotating mass. This arrangement may also assist with agitators 3 designed to be used in a high thermally-cyclic service. Such spot welds 38 can be easily removed in the event of readjustment or replacement as discussed above.

The agitator 3 of the improved system 200 can be provided as a kit of parts including an agitator 3 and the wearing parts 36 for attachment thereto. Alternatively, the wearing parts 36 may be provided separately and are retro-fittable onto an existing agitator 3.

The wearing parts 36 may be made of any suitable material. However, in particular embodiments the wearing parts 36 may be formed of a steel. This steel may preferably be an austenitic stainless steel. More preferably this steel may be AISI 316, 316Ti, 310, 309, 321 and/or 302. These steels have been shown to provide a good balance of high temperature strength, hardness, corrosion resistance and availability. Such steels also do not have any requirement for post-fabrication heat treatment. As there may be risk of the wearing part 36 contacting the inner surface of the reactor vessel 1 during operation it is inadvisable to use very high hardness steels as this can introduce additional wear on the wall of the reactor vessel 1.

The agitator 3 of the improved system 200 may further comprise a central shaft auger 35. This allows the agitator 3 to be further operated in a "reverse" mode in which downward force is applied through the discharge nozzle of the reactor vessel 1 into a char hopper vessel by the central shaft auger 35. This allows char to be expelled from the reaction vessel 1.

The invention claimed is:

1. A reactor assembly for heating plastic material comprising:
   a reactor vessel comprising a central axis;
   a furnace arranged to heat the reactor vessel to a temperature in excess of 350° C.; and
   an agitator mounted within the reactor vessel, the agitator comprising:
   one or more blade(s) distal from the central axis for mixing contents of the reactor vessel in use; and
   one or more wearing part(s) detachably mounted to the blade(s) to extend from the blade(s) for engaging with and removing char from the reactor vessel, wherein the wearing part(s) are spaced a first distance from an internal surface of the reactor vessel;
   wherein the wearing part(s) are adjustable for adjusting either or both of:
   the radial position of the wearing part(s) on the blade(s); or
   the axial position of the wearing part(s) on the blade(s).

2. The reactor assembly of claim 1, wherein the one or more blade(s) each comprise a main portion distal from the central axis and one or more base portion(s) extending from the main portion towards the central axis, and wherein the one or more wearing part(s) are mounted to the base portion(s) to extend axially beyond the base portion(s).

3. The reactor assembly of claim 1, wherein one or more wearing part(s) are mounted to the blade(s) such that they extend radially from the blade(s) with respect to the central axis.

4. The reactor assembly of claim 1, wherein the blade(s) are generally helical.

5. The reactor assembly of claim 1, wherein one of:
   (a) the wearing part(s); or
   (b) the blade(s),
comprise an elongate slot, and the wearing part(s) are mounted to the blade(s) via one or more bolt(s) passing through the slot.

6. The reactor assembly of claim 5, further comprising one or more spring washer(s), wherein the one or more bolt(s) pass through the spring washer(s) to engage the wearing part(s).

7. The reactor assembly of claim 1, wherein the one or more blade(s) comprise a plurality of blades.

8. The reactor assembly of claim 1, wherein each blade comprises a plurality of the one or more wearing part(s) distributed along its length such that a plane orthogonal to the central axis at any point along the central axis in a region of the one or more blade(s) passes through at least one wearing part.

9. The reactor assembly of claim 1, wherein the wearing part(s) are formed of steel.

10. The reactor assembly of claim 7, wherein the one or more blade(s) comprises two blades.

11. The reactor assembly of claim 8, wherein the plane orthogonal to the central axis at any point along the central axis in the region of the one or more blade(s) passes through only one wearing part.

12. The reactor assembly of claim 9, wherein the wearing part(s) are formed of an austenitic stainless steel.

13. The reactor assembly of claim 9, wherein the wearing part(s) are formed of AISI 316, 316Ti, 310, 309, 321 and/or 302.

* * * * *